(12) United States Patent
Blount

(10) Patent No.: US 11,753,062 B1
(45) Date of Patent: Sep. 12, 2023

(54) HAULING MAT DEVICE

(71) Applicant: Stephen Blount, Franklin, TN (US)

(72) Inventor: Stephen Blount, Franklin, TN (US)

( * ) Notice: Subject to any disclaimer, the term of this patent is extended or adjusted under 35 U.S.C. 154(b) by 0 days.

(21) Appl. No.: 17/873,615

(22) Filed: Jul. 26, 2022

(51) Int. Cl.
*B62B 15/00* (2020.01)

(52) U.S. Cl.
CPC .................................. *B62B 15/007* (2013.01)

(58) Field of Classification Search
CPC ... B62B 15/007; B62B 15/006; B62B 15/008; B62B 15/009; B65G 65/28
USPC .......................................................... 280/19
See application file for complete search history.

(56) References Cited

U.S. PATENT DOCUMENTS

| | | | | |
|---|---|---|---|---|
| 4,682,447 | A * | 7/1987 | Osborn | B60R 9/048 383/4 |
| 5,104,133 | A | 4/1992 | Reiner | |
| 5,529,321 | A | 6/1996 | Thompson | |
| 5,660,402 | A | 8/1997 | Jones | |
| 5,763,031 | A * | 6/1998 | Huang | D06N 7/00 428/36.1 |
| 6,276,698 | B1 * | 8/2001 | Calandra | B62B 15/00 280/18 |
| 9,327,754 | B2 | 5/2016 | Mastromatto | |
| 9,550,638 | B1 * | 1/2017 | Chuman | B62B 11/00 |
| 2012/0074679 | A1 * | 3/2012 | Kinsey | B62B 15/007 280/845 |
| 2013/0181416 | A1 * | 7/2013 | Ross | B62B 15/00 280/18 |

FOREIGN PATENT DOCUMENTS

| | | |
|---|---|---|
| WO | WO9406666 | 3/1994 |
| WO | WO2011120173 | 10/2011 |

* cited by examiner

*Primary Examiner* — John D Walters

(57) ABSTRACT

A hauling mat device for conveniently attaching to a hitch ball and hauling a load by dragging the device along the ground includes a sheet constructed of a resilient, flexible material having a pair of hitch holes extending through the sheet on each end edge of a pair of end edges of the sheet, wherein the pair of hitch holes are configured for receiving a hitch ball therethrough. The device is deployable in a first mode, wherein one of the hitch holes is hitched to the hitch ball and a load is placed on the sheet for hauling. The device is also deployable in a second mode, wherein both hitch holes are hitched to the hitch ball with the load placed in a loop defined by the sheet. In the first and second modes, the load is hauled by dragging the device along a ground surface.

16 Claims, 6 Drawing Sheets

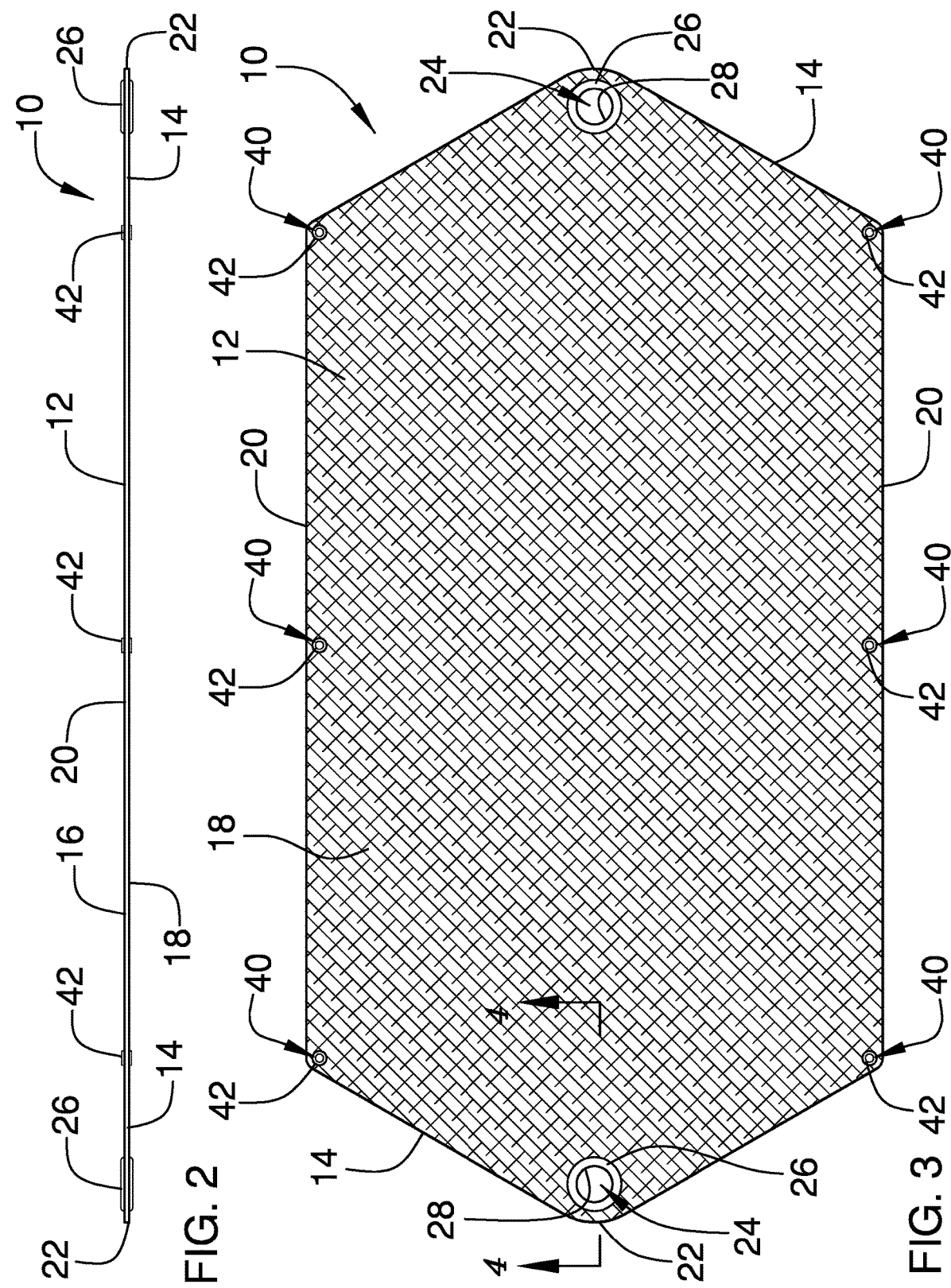

US 11,753,062 B1

HAULING MAT DEVICE

(B) CROSS-REFERENCE TO RELATED APPLICATIONS

Not Applicable

(C) STATEMENT REGARDING FEDERALLY SPONSORED RESEARCH OR DEVELOPMENT

Not Applicable

(D) THE NAMES OF THE PARTIES TO A JOINT RESEARCH AGREEMENT

Not Applicable

(E) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(F) STATEMENT REGARDING PRIOR DISCLOSURES BY THE INVENTOR OR JOINT INVENTOR

Not Applicable

(G) BACKGROUND OF THE INVENTION

(1) Field of the Invention

The disclosure relates to hauling devices and more particularly pertains to a new hauling device for conveniently attaching to a hitch ball and hauling a load by dragging the device along the ground.

(2) Description of Related Art Including Information Disclosed Under 37 CFR 1.97 and 1.98

The prior art relates to hauling devices which use a tarpaulin or like device to drag a load, often behind a vehicle. The prior art discloses devices which resort to various geometries to tie the device to the vehicle in order to haul the load. However, all of the devices in the prior art require the use of a line or straps to attach the load to a vehicle, which can result in difficult attachment processes and tangled devices. The prior art does not disclose a device which attaches to a vehicle through as few as one connection point, wherein the connection point facilitates connection through a simple placement of the connection point around a hitch ball rather than more difficult and time-consuming knots.

(H) BRIEF SUMMARY OF THE INVENTION

An embodiment of the disclosure meets the needs presented above by generally comprising a sheet constructed of a resilient, flexible material having a pair of hitch holes extending through the sheet on each end edge of a pair of end edges of the sheet, wherein the pair of hitch holes are configured for receiving a hitch ball therethrough. The device is deployable in a first mode, wherein one of the hitch holes is hitched to the hitch ball and a load is placed on the sheet for hauling. The device is also deployable in a second mode, wherein both hitch holes are hitched to the hitch ball with the load placed in a loop defined by the sheet. In the first and second modes, the load is hauled by dragging the device along a ground surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(I) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a side view of an embodiment of the disclosure.

FIG. 3 is a bottom view of an embodiment of the disclosure.

(J) DETAILED DESCRIPTION OF THE INVENTION

Figure 1:
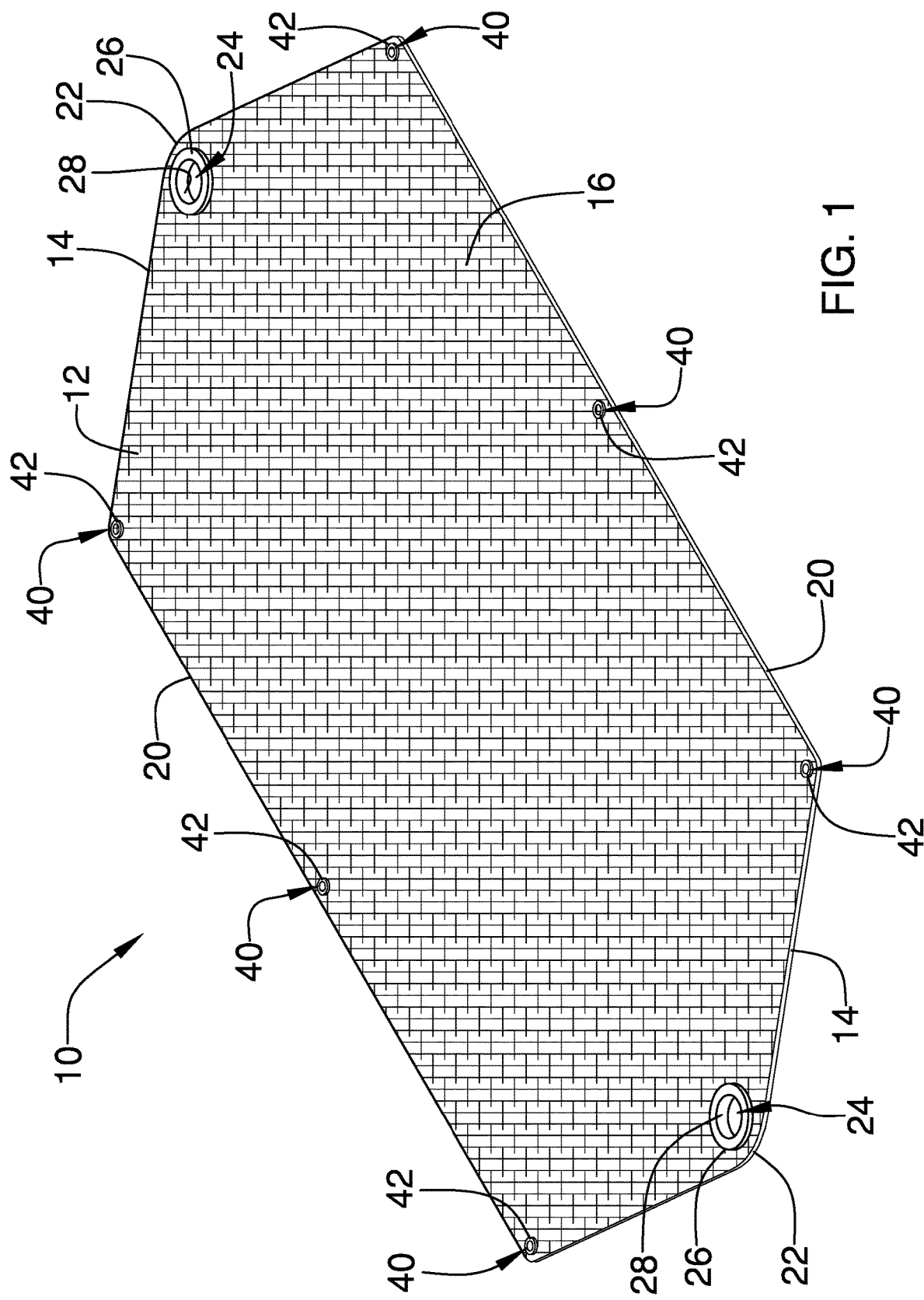
FIG. 1 is a top front side perspective view of a hauling mat device according to an embodiment of the disclosure.
Figure 4:
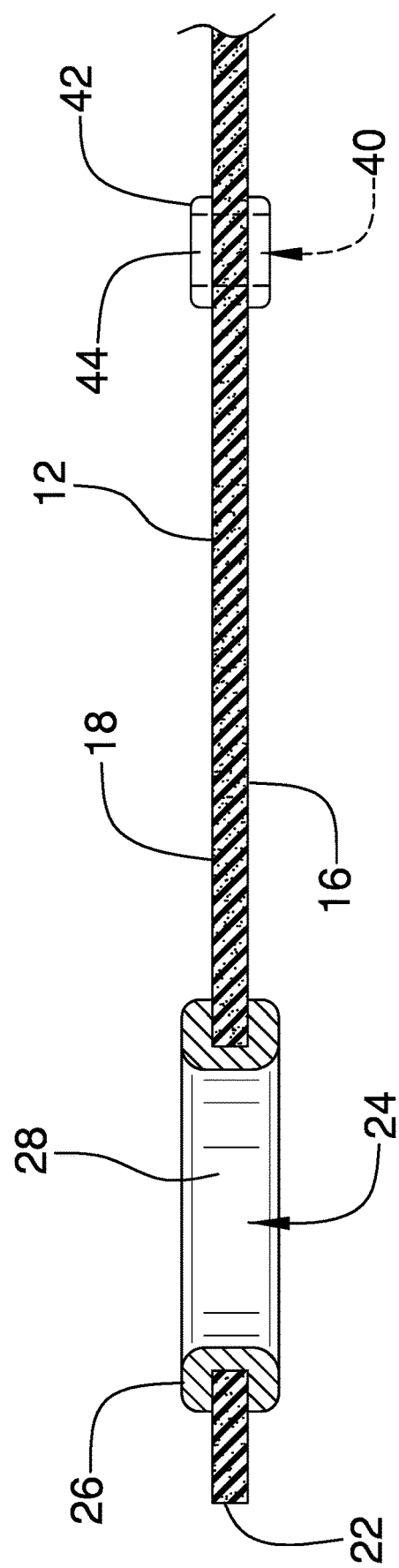
FIG. 4 is a cross-sectional view of an embodiment of the disclosure from the arrows 4-4 in FIG. 3.
Figure 5:
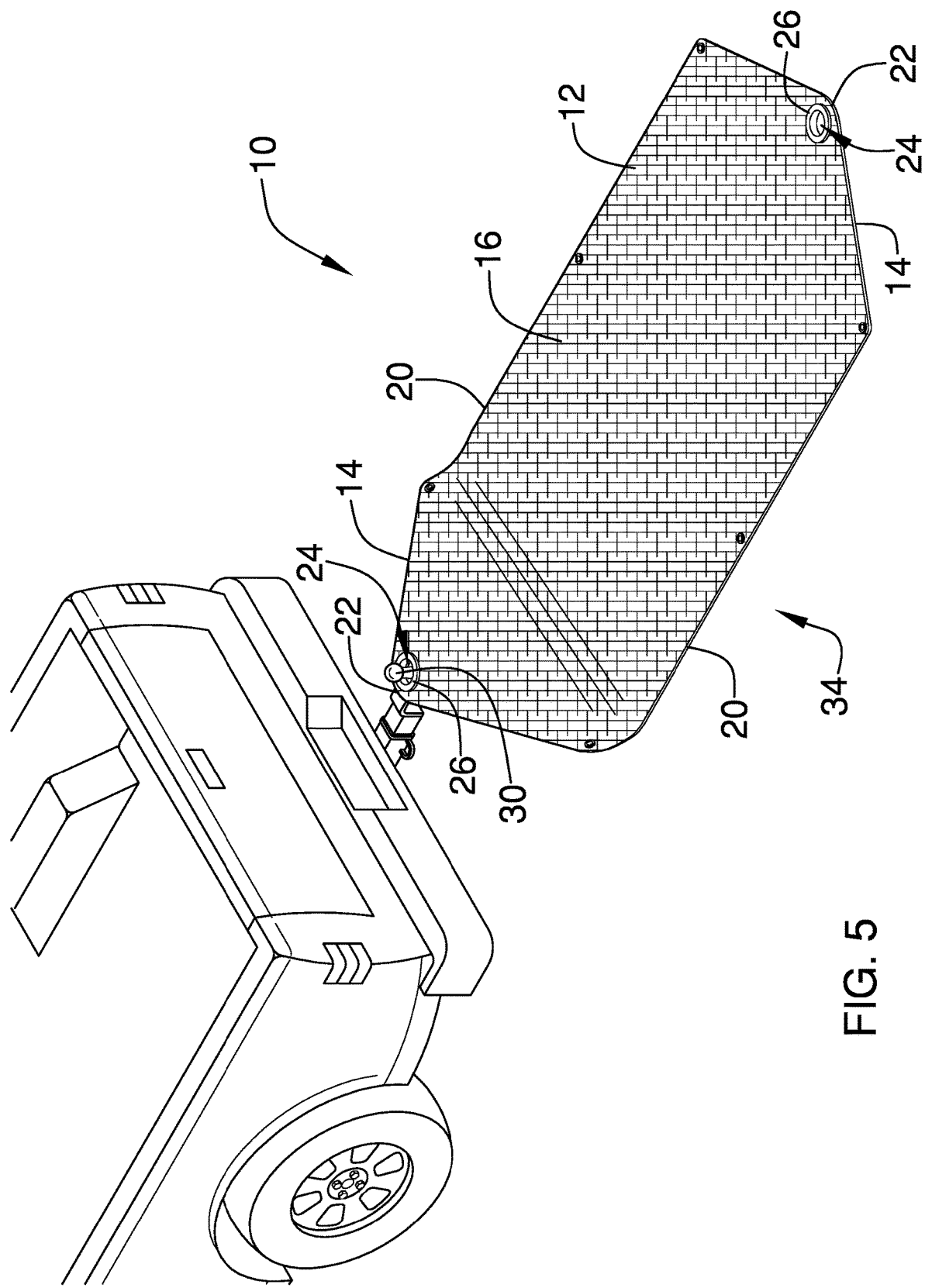
FIG. 5 is an in-use view of an embodiment of the disclosure.
Figure 6:
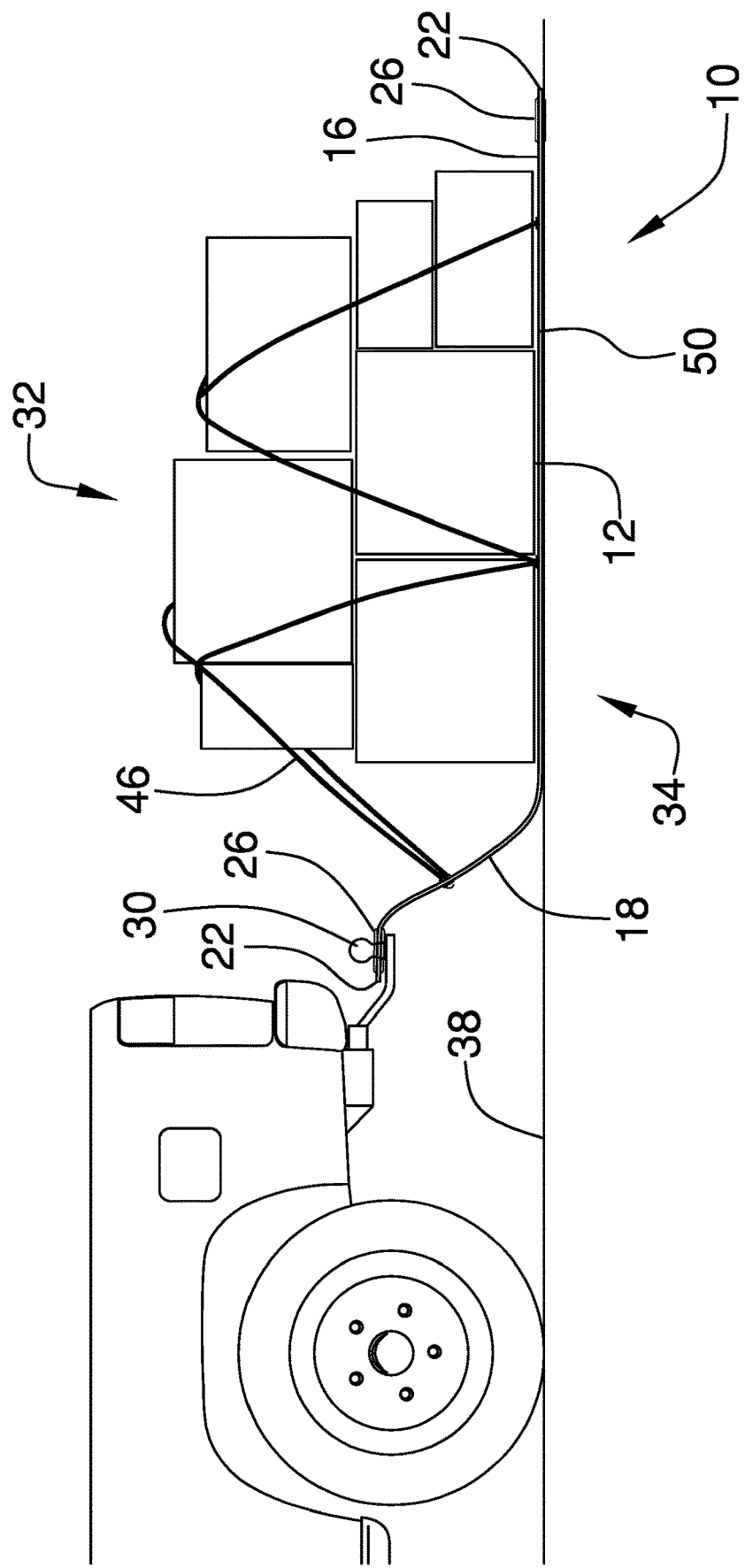
FIG. 6 is an in-use view of an embodiment of the disclosure.
Figure 7:
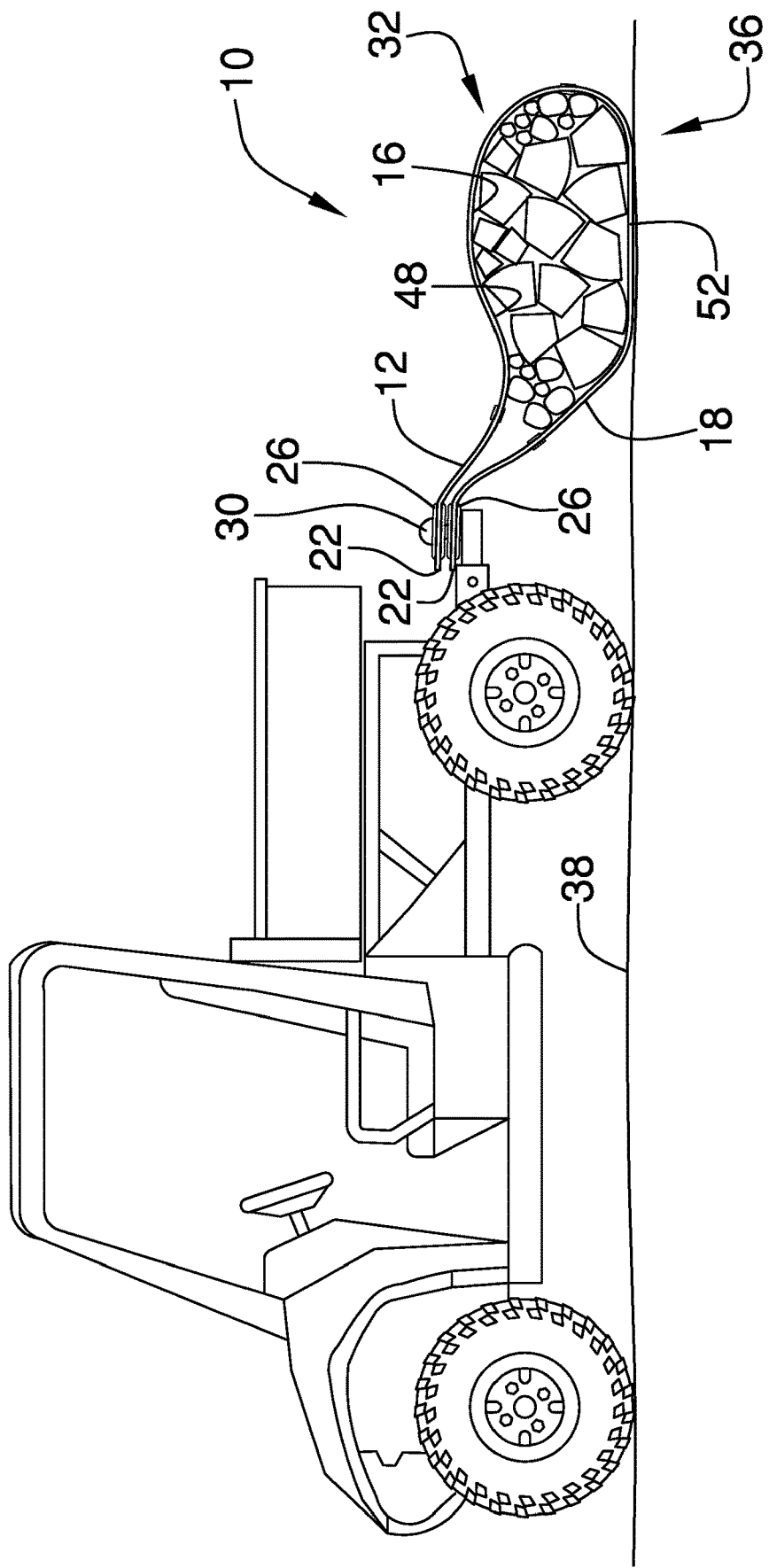
FIG. 7 is an in-use view of an embodiment of the disclosure.

With reference now to the drawings, and in particular to FIGS. 1 through 7 thereof, a new hauling device embodying the principles and concepts of an embodiment of the disclosure and generally designated by the reference numeral 10 will be described.

As best illustrated in FIGS. 1 through 7, the hauling mat device 10 generally comprises a sheet 12 constructed of a resilient, flexible material, wherein the sheet 12 elongates between a pair of end edges 14, has a top surface 16 and a bottom surface 18, and has a pair of lateral edges 20 extending between the end edges 14. The sheet 12 is configured for supporting a load 32 on the top surface 16 and dragging the bottom surface 18 along a ground surface 38. Each end edge 14 tapers from the pair of lateral edges 20 to a respective point on each end edge 14, each point of each edge defining each of a pair of ends 22 of the sheet 12. The pair of ends 22 of the sheet 12 is aligned along a central longitudinal axis of the sheet 12 and each lateral edge 20 is parallel to the central longitudinal axis. The sheet 12 has a thickness from the top surface 16 to the bottom surface 18 between 0.75 and 1.25 centimeters, a width between the lateral edges 20 between 1.0 and 1.3 meters, and a length between the pair of ends 22 of the sheet 12 between 2.4 and 3.7 meters.

Each of a pair of hitch holes 24 extends through the top surface 16 and the bottom surface 18. Each hitch hole 24 is positioned proximate a respective end 22 of the sheet 12 and is centered on the central longitudinal axis. Each hitch hole 24 is configured for receiving a hitch ball 30 therethrough. Each of a pair of hitch grommets 26 is concentrically coupled to an associated hitch hole 24 and has an inner diameter 28 between 6.0 and 9.0 centimeters.

The sheet 12 is configured for deploying in a first mode 34, which comprises one of the pair of hitch holes 24 receiving a hitch ball 30 therethrough, a first portion 50 of the bottom surface 18 abutting the ground surface 38, and the load 32 being positioned on the top surface 16 opposite the first portion 50 of the bottom surface 18. The sheet 12 is also configured for deploying in a second mode 36, which comprises each hitch hole 24 receiving the hitch ball 30 therethrough, the sheet 12 wrapping the load 32 within a loop 48 defined by the sheet 12, and a second portion 52 of the bottom surface 18 abutting the ground surface 38.

Each of a plurality of tie holes 40 extend through the top surface 16 and the bottom surface 18. Each tie hole 40 is positioned proximate an associated lateral edge 20 and is configured for receiving a line 46 therethrough. The sheet 12 and the tie holes 40 are configured to cooperate with the line 46 to secure the load 32 by the line 46 wrapping the load 32 while passing through each of a portion of the plurality of tie holes 40 and around the associated lateral edge 20 of the sheet 12. Each of a plurality of tie grommets 42 is concentrically coupled to an associated tie hole 40 and has an inner diameter 44 between 0.75 and 1.25 centimeters.

In use, the hauling mat device 10 may be used in the first mode 34 by hitching one of the hitch holes 24 to a hitch ball 30 so that the first portion 50 of the bottom surface 18 of the sheet 12 abuts the ground surface 38. The load 32 is placed on the top surface 16 of the sheet 12. Then the hauling mat device 10 is ready to be dragged to another location, hauling the load 32 with it. Additionally, the line 46 can be wrapped around the load 32, through each of a portion of the plurality of tie holes 40, and around the associated lateral edge 20 of the sheet 12 to further secure the load 32 to the hauling mat device 10.

The hauling mat device 10 may be used in the second mode 36 by hitching one of the hitch holes 24 to a hitch ball 30 such that the bottom surface 18 of the sheet 12 partly abuts the ground surface 38. The load 32 is then placed on the top surface 16 of the sheet 12 and the other hitch hole 24 is hitched onto the hitch ball 30, thereby looping the sheet 12 with the load 32 contained within the loop 48. The second portion 52 of the bottom surface 18 will abut the ground surface 38. Then the hauling mat device 10 can be dragged to the other location with the load 32 contained within the loop 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hauling mat device comprising:
    a sheet, said sheet being constructed of a resilient, flexible material, said sheet elongating between a pair of end edges, said sheet having a top surface and a bottom surface, said sheet having a pair of lateral edges extending between said end edges, said sheet being configured for supporting a load on said top surface and dragging said bottom surface along a ground surface;
    a pair of hitch holes, each said hitch hole extending through said top surface and said bottom surface, each said hitch hole being positioned proximate a respective end edge of said sheet, each said hitch hole being configured for receiving a hitch ball therethrough,
    wherein said sheet is configured for deploying in a first mode, said first mode comprising one of said pair of hitch holes receiving a hitch ball therethrough, a first portion of said bottom surface abutting the ground surface, and the load being positioned on said top surface opposite said first portion of said bottom surface,
    wherein said sheet is configured for deploying in a second mode, said second mode comprising each said hitch hole receiving the hitch ball therethrough, said sheet wrapping the load within a loop defined by said sheet, and a second portion of said bottom surface abutting the ground surface.

2. The device of claim 1, further comprising a pair of hitch grommets, each said hitch grommet being concentrically coupled to an associated hitch hole.

3. The device of claim 2, wherein each said hitch grommet has an inner diameter between 6.0 and 9.0 centimeters.

4. The device of claim 1, further comprising a plurality of tie holes, each said tie hole extending through said top surface and said bottom surface, each said tie hole being positioned proximate an associated lateral edge, each said tie hole being configured for receiving a line therethrough, said sheet and said tie holes being configured to cooperate with the line to secure the load by the line wrapping the load while passing through each of a portion of said plurality of tie holes and around said associated lateral edge of said sheet.

5. The device of claim 4, further comprising a plurality of tie grommets, each said tie grommet being concentrically coupled to an associated tie hole.

6. The device of claim 5, wherein each said tie grommet is smaller than each said hitch grommet.

7. The device of claim 6, wherein each said tie grommet has an inner diameter between 0.75 and 1.25 centimeters.

8. The device of claim 1, wherein each end edge tapers from said pair of lateral edges to a respective point on each said end edge, each said point of each said edge defining each of a pair of ends of said sheet, each said hitch hole being positioned proximate a respective end of said sheet.

9. The device of claim 8, wherein said pair of ends of said sheet is aligned along a central longitudinal axis of said sheet.

10. The device of claim 8, wherein said sheet has a length between said pair of ends between 2.4 and 3.7 meters.

11. The device of claim 1, wherein each said lateral edge is parallel to said central longitudinal axis of said sheet.

12. The device of claim 1, wherein said sheet has a thickness from said top surface to said bottom surface between 0.75 and 1.25 centimeters.

13. The device of claim 1, wherein said sheet has a width between said lateral edges between 1.0 and 1.3 meters.

14. The device of claim 1, wherein each said hitch hole is centered on a central longitudinal axis of said sheet.

15. The device of claim 1, wherein said sheet is constructed of rubber.

16. A hauling mat device comprising:

a sheet, said sheet being constructed of a resilient, flexible material, said sheet elongating between a pair of end edges, said sheet having a top surface and a bottom surface, said sheet having a pair of lateral edges extending between said end edges, said sheet being configured for supporting a load on said top surface and dragging said bottom surface along a ground surface,
    wherein each said end edge tapers from said pair of lateral edges to a respective point on each said end edge, each said point of each said edge defining each of a pair of ends of said sheet,
    wherein said pair of ends of said sheet is aligned along a central longitudinal axis of said sheet,
    wherein each said lateral edge is parallel to said central longitudinal axis of said sheet,
    wherein said sheet has a thickness from said top surface to said bottom surface between 0.75 and 1.25 centimeters,
    wherein said sheet has a width between said lateral edges between 1.0 and 1.3 meters,
    wherein said sheet has a length between said pair of ends of said sheet between 2.4 and 3.7 meters;

a pair of hitch holes, each said hitch hole extending through said top surface and said bottom surface, each said hitch hole being positioned proximate a respective end of said sheet, each said hitch hole being configured for receiving a hitch ball therethrough,
    wherein each said hitch hole is centered on said central longitudinal axis,
    wherein said sheet is configured for deploying in a first mode, said first mode comprising one of said pair of hitch holes receiving a hitch ball therethrough, a first portion of said bottom surface abutting the ground surface, and the load being positioned on said top surface opposite said first portion of said bottom surface,
    wherein said sheet is configured for deploying in a second mode, said second mode comprising each said hitch hole receiving the hitch ball therethrough, said sheet wrapping the load within a loop defined by said sheet, and a second portion of said bottom surface abutting the ground surface;

a pair of hitch grommets, each said hitch grommet being concentrically coupled to an associated hitch hole, wherein each said hitch grommet has an inner diameter between 6.0 and 9.0 centimeters;

a plurality of tie holes, each said tie hole extending through said top surface and said bottom surface, each said tie hole being positioned proximate an associated lateral edge, each said tie hole being configured for receiving a line therethrough, said sheet and said tie holes being configured to cooperate with the line to secure the load by the line wrapping the load while passing through each said of a portion of said plurality of tie holes and around said associated lateral edge of said sheet; and a plurality of tie grommets, each said tie grommet being concentrically coupled to an associated tie hole, each said tie grommet having an inner diameter between 0.75 and 1.25 centimeters.

\* \* \* \* \*